2,805,976

PREPARATION OF ADRENOCORTICOTROPHIN BY ADSORPTION ON STARCH

Irby M. Bunding, Chicago, Ill., assignor to Armour and Company, Chicago, Ill., a corporation of Illinois No Drawing. Original application August 15, 1950, Serial No. 179,650, now Patent No. 2,669,536, dated February 16, 1954. Divided and this application December 16, 1953, Serial No. 398,625

3 Claims. (Cl. 167—74)

This invention relates to the preparation of an adrenal gland stimulating concentrate. The invention is particularly useful in the treatment of an adrenal gland stimulating substance for the elimination of contaminants and for producing a product of exceedingly high potency.

Considerable research has been carried on with respect to the treatment of pituitary glands to obtain adrenocorticotrophic hormone extracts. As a result of this research, extracts have been prepared which are suitable for injection into rats, guinea pigs, and other animals, and recently, as described in an application Serial No. 122,588, filed October 20, 1949, by Joseph D. Fisher, a method has been found for preparing an adrenal gland stimulating substance suitable for injection into humans.

In view of the fact that the adrenocorticotrophic substance has been found extremely effective in alleviating certain pathological conditions in human beings and in view of the fact that this desirable effect is obtained by actual injection of the hormone substance into the human body, it is of great importance that methods be developed for preparing the substance as free from undesirable contaminants and as highly potent as possible. Any process which effectively eliminates the undesirable factors while at the same time retaining the potency of the active substance in the product obtained is of great value.

An object of the present invention is to provide a process for the treatment of a crude form of the adrenal gland stimulating substance to produce a product of extremely high potency. Another object of the invention is to treat an adsorbent material having the adrenal gland stimulating substance adsorbed thereon with an acid eluting agent. A still further object is to provide a process of simple steps in which the adrenal gland stimulating substance, dissolved or suspended in a liquid, is adsorbed on an adsorbent and the inert material removed from the adsorbed material by washing, after which the active hormone substance is eluted from the adsorbent with an acid eluant. Other specific objects and advantages will appear as the specification proceeds.

In one modification of the process, a solution or suspension containing an active adrenal gland stimulating substance is subjected to the action of a suitable adsorption agent so as to adsorb thereon the active substance. The adsorbent containing the adsorbed material is then washed with a suitable reagent to remove inert material, that is, material containing none or very little of the adrenal gland stimulating substance. After removal of the inert material, the adsorbent and the material adsorbed thereon are subjected to the action of an acid eluant to elute the desired adrenocorticotrophic hormone. The hormone substance is then separated from the eluant by any suitable means, such as by a simple lyophilization or distillation step.

Any adrenocorticotrophic hormone containing substance, dissolved or suspended in a suitable solvent, may be used as a starting material in the present invention. I prefer to employ a fairly well purified substance, such as the product obtained by Joseph D. Fisher in his aforementioned application Serial No. 122,588, or the product obtained by the process described in the application of Lottie J. Walaszek, Serial No. 172,011, for Adrenal Gland Stimulating Substance and Method of Preparing. However, if desired, the process is also applicable to lower potency concentrates of the hormone substance.

Any suitable adsorbent may be used as the adsorbing agent for the above starting material. Suitable adsorbents in the present process are fibrous or granular substances, or mixtures thereof, which will not decompose the adrenocorticotrophic hormone or the various solvents employed, and in addition are not themselves soluble in, or decomposed by, the solvent carrying the hormone, or by the wash reagents, or by the acid eluant. Although a wide variety of substances, including carbohydrates, alkaline earth compounds, and silicates, may be used as adsorbents in the process, I have found paper, starch, and diatomaceous earths to be particularly suitable.

The effectiveness of the above adsorbents may be enhanced if, before use in the process, they are washed with a buffer having a pH of 3.0 to 8.5. A buffer comprising acetic acid and sodium acetate is satisfactory for this purpose, although if desired any buffer solution possessing a pH within the range 3.0 to 8.5 may be used. It is also desirable to pre-treat the adsorbent with a dilute acid wash.

Actual adsorption of the hormone on the adsorbent may be achieved in any suitable manner, as for example by mixing and agitating. I have found that satisfactory adsorption is obtained when the pH of the mixture at this stage is within the range of 3.0 to 8.5. Desirable results are achieved when the adsorption is carried on with the pH slightly on the acid side, and the preferred level is at about 4.5.

After the adrenal gland stimulating substance has been adsorbed on the adsorbent, the solid material is separated from solution and may be washed to remove inert material. The wash reagent is preferably a fresh portion of the same solvent as that from which the hormone substance was adsorbed. However, other liquids, such as water or buffer solutions, may be used, and a beneficial result will be obtained by the use of any of the well-known washing reagents, with the exception of those which fall within the category of eluants, as hereinafter defined.

The adsorbent, together with the hormone substance adsorbed thereon, is next subjected to elution with an acid eluant. As an eluant I may use any acid which is capable of reducing the pH of the mixture during the elution step to a point below 4.5. The inorganic acids are preferred, and hydrochloric acid has been found to be particularly suitable. In the practice of the present invention the above acids are usually mixed with water or other solvents so that the pH of the mixture during elution is above 1.0. Most favorable results are obtained when the pH at this stage is above about 1.0 but below the pH of the mixture during the adsorption and washing steps, and at any rate below a pH of about 4.5. I have found that the use of pH 1.5 is quite practical in the process and produces exceedingly favorable results.

After the eluting step with acid, the solids are separated out, as for example by filtration, and the filtrate is treated to recover the adrenal gland stimulating substance as a dry product. This may be achieved by any suitable method, preferably by lyophilization.

By employing the above method, it is possible to produce an adrenocorticotrophic hormone having a potency of 7 or 8 times that of the starting material. In specific instances, where the starting material has possessed a potency 3½ times that of standard, the process of the present invention has been employed to obtain a product having a potency as much as 30 times that of standard.

In other cases, where a more highly purified starting material has been used, products possessing a potency 100 times greater than standard have been made by the present process. The generally accepted standard is that which has been adopted by the Technical Advisory Committee to the Study Section for Metabolism and Endocrinology of the National Institutes of Health. The lot of material from which this standard was adopted is identified as LAIA, and a portion of this lot has been set aside by Armour and Company for reference purposes. This standard is approximately that of a physically-chemically pure hormone extracted from the pituitary glands and described by Sayers, Sayers and Woodbury in Endocrinology, volume 42, No. 5, May 1948, page 385.

Specific examples of the process may be set out as follows:

Example I 1 gram of an adrenocorticotrophic hormone substance, prepared by the method set forth in the aforementioned Walaszek application Serial No. 172,011 and having a potency 25 times that of standard, was used as the starting material. The adsorbent was a 50 gram pack of Solka Floc filter paper (a pure cellulose product made by the Brown Company, Berlin, New Hampshire), which was pretreated by washing twice with 250 cc. volumes of 0.04 M sodium acetate-acetic acid buffer at a pH of 4.5, twice with 250 cc. volumes of 0.02 M hydrochloric acid, and then again with a 250 cc. volume of the acetate buffer at pH 4.5.

In carrying out the process, 1 gram of the above adrenocorticotrophic hormone substance was suspended in 300 cc. of the acetate buffer at a pH of 4.5 and mixed with the 50 gram portion of Solka Floc which had been pretreated as described above. After the materials were completely mixed, the mixture was filtered, and the solid phase was washed with 4 separate 200 cc. volumes of the acetate buffer. The solid washed material was then treated with 200 cc. of 0.1 M hydrochloric acid to bring about elution of the adrenocorticotrophic substance from the paper adsorbent at a pH of 1.5. The hydrochloric acid solution containing the eluted active substance was then lyophilized and the active hormone recovered as a dry powder. The dried end product possessed a potency approximately 100 times greater than standard.

Example II 200 mg. of an adrenocorticotrophic hormone substance, prepared by the method set forth in the aforementioned Fisher application Serial No. 122,588 and having a potency 3½ times that of standard, was used as the starting material. The adsorbent was a 10 gram portion of Filtercel (a diatomaceous earth material), which was pretreated by washing twice with 250 cc. volumes of 0.04 M sodium acetate-acetic acid buffer at a pH of 4.5, twice with 250 cc. volumes of 0.02 M hydrochloric acid, and then again with a 250 cc. volume of the acetate buffer at pH 4.5.

In carrying out the process, 200 mg. of the above adrenocorticotrophic hormone substance was suspended in 50 cc. of the acetate buffer at a pH of 4.5 and mixed with the 10 gram portion of Filtercel, which had been pretreated as described above. After the materials were completely mixed, the mixture was filtered, and the solid phase was washed with 4 separate 200 cc. volumes of the acetate buffer. The solid washed material was then treated with 200 cc. of 0.1 M hydrochloric acid to bring about elution of the adrenocorticotrophic substance from the adsorbent at a pH of 1.5. The hydrochloric acid solution containing the eluted active substance was then lyophilized and active hormone recovered as a dry powder.

Example III 1 gram of an adrenocorticotrophic hormone substance, prepared by the method set forth in the aforementioned Fisher application Serial No. 122,588 and having a potency 3½ times that of standard, was used as the starting material. The adsorbent was a 50 gram pack of S & S No. 595 filter paper (made by Schleicher & Schull), which was pretreated by washing twice with 250 cc. volumes of 0.04 M sodium acetate-acetic acid buffer at a pH of 4.5, twice with 250 cc. volumes of 0.02 M hydrochloric acid, and then again with a 250 cc. volume of the acetate buffer at pH 4.5.

In carrying out the process, 1 gram of the above adrenocorticotrophic hormone substance was suspended in 300 cc. of the acetate buffer at a pH of 4.5 and mixed with the 50 gram pack of filter paper, which had been pre-treated as described above. After the materials were completely mixed, the mixture was filtered, and the solid phase was washed with 4 separate 200 cc. volumes of the acetate buffer. The solid washed material was then treated with 200 cc. of 0.1 M hydrochloric acid to bring about elution of the adrenocorticotrophic substance from the paper adsorbent at a pH of 1.5. The hydrochloric acid solution containing the eluted active substance was then lyophilized and the active hormone recovered as a dry powder.

Example IV 100 mg. of an adrenocorticotrophic hormone substance, prepared by the method set forth in the aforementioned Walaszek application Serial No. 172,011 and having a potency 3½ times that of standard, was used as the starting material.

In carrying out the process, approximately 15 grams of starch was slurried with acetone into a glass column. After the starch had settled, the height of the starch measured 22 cm. and the diameter 2.1 cm. Starch was removed from the top of the column until the height of the column measured 12 cm. The column was then washed with .02 M HCl until the pH of solution coming off the column measured 2.1. The column was then washed with .02 M acetate buffer until the pH of solution coming off the column was 4.5.

100 mg. of the above adrenocorticotrophic hormone starting material was stirred with 5 ml. of the buffer and floated on the surface of the column. The column was then washed with .02 M acetate buffer, and the solid washed material was treated with .02 M HCl to bring about elution of the adrenocorticotrophic substance from the starch adsorbent at a pH of 2.1. The hydrochloric acid solution containing the eluted active substance was then lyophilized and the active hormone recovered as a dry powder.

Example V 100 mg. of adrenocorticotrophic hormone substance, prepared by the method set forth in the aforementioned Walaszek application Serial No. 172,011 and having a potency 25 times that of standard, was used as the starting material.

In carrying out the process, 15 grams of Solka Floc was slurried with acetone into a glass column. After the Solka Floc had settled and the acetone had drained to the surface of the column, the volume of Solka Floc measured 12 cc. by 1.9 cc. in diameter. The column was washed with .02 M HCl until the solution coming off had a pH of 2. The column was then washed with a mixture of 50% 3A alcohol, 25% acetate buffer of pH 4.9, and 25% distilled water. This was continued until the solution coming off the column was at a pH of 4.5 to 5.0.

100 ml. of the above adrenocorticotrophic starting material was stirred with approximately 5 cc. of the alcohol-acetate buffer. This was gently floated on the surface of the column with pipette and allowed to drain to the surface. The column was washed with a further quantity of the alcohol-acetate buffer solution and was then eluted with .02 M HCl at a pH of 2. The hydrochloric acid solution containing the eluted active substance was then lyophilized and the active hormone recovered as a dry powder.

Example VI

Approximately 15 grams of Solka Floc was slurried with acetone into a glass column. After the Solka Floc had settled and the acetone had drained to the surface of the column, the volume of Solka Floc measured 12 cc. by 2.0 cc. in diameter. The column was washed with 0.01 M $H_2SO_4$ until the solution coming off the column became acidic and was then washed with 0.02 M acetate buffer until the solution coming off the column rose in pH to 4.5.

100 mg. of an adrenocorticotrophic hormone substance, prepared by the method set forth in the aforementioned Walaszek application Serial No. 172,011 and having a potency 25 times that of standard, was stirred with 5 cc. of acetate buffer and gently floated on the surface of the column. The column was then washed with the acetate buffer. After this the column was treated with 0.01 M $H_2SO_4$ to bring about elution of the adrenocorticotrophic substance from the Solka Floc. The sulfuric acid solution containing the eluted active substance was then lyophilized and the active hormone recovered as a dry powder.

This application is a division of application Serial No. 179,650, entitled "Preparation of an Adrenal Gland Stimulating Substance," now Patent No. 2,669,536.

While in the foregoing specification I have set forth specific steps of the process and the use of specific materials in detail, it will be understood that such details may be varied widely by those skilled in the art without departing from the spirit of my invention.

I claim:

1. A process for preparing an adrenocorticotrophin substance from a solution containing the substance comprising adsorbing said substance on starch at a pH above 3.0 and eluting the adsorbed substance at a pH which is lower than the adsorption pH and which is within the pH range from 1.0 to 4.5.

2. A process for preparing an adrenocorticotrophin substance from a solution containing the substance comprising adsorbing said substance on starch at a pH above 3.0 and eluting the adsorbed substance with hydrochloric acid at a pH which is lower than the adsorption pH and which is within the pH range from 1.0 to 4.5.

3. A process for preparing an adrenocorticotrophin substance from a solution containing the substance comprising adsorbing said substance on starch at a pH of about 4.5, washing the adsorbed material to remove inert material, and eluting the remaining adsorbed substance with hydrochloric acid at a pH from 1.0 to 4.5.

References Cited in the file of this patent

UNITED STATES PATENTS 2,669,536   Bunding _____ Feb. 16, 1954

OTHER REFERENCES

Mendenhall et al.: Proc. Soc. Exptl. Biol. and Med., Dec. 1951, pages 668 to 670.

Astwood et al.: Recent Progress in Hormone Res. (Pincus), Academic Press Inc., N. Y. (1952) pp. 30–36.

Ralli: Adrenal Cortex (1951), pp. 30 and 31.